United States Patent
Brand

(10) Patent No.: US 9,626,968 B2
(45) Date of Patent: Apr. 18, 2017

(54) SYSTEM AND METHOD FOR CONTEXT SENSITIVE INFERENCE IN A SPEECH PROCESSING SYSTEM

(71) Applicant: Verint Systems Ltd., Herzilya Pituach (IL)

(72) Inventor: Michael Brand, Victoria (AU)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 0 days.

(21) Appl. No.: 14/594,570

(22) Filed: Jan. 12, 2015

(65) Prior Publication Data

US 2015/0179174 A1 Jun. 25, 2015

Related U.S. Application Data

(63) Continuation of application No. 12/491,587, filed on Jun. 25, 2009, now abandoned.

(60) Provisional application No. 61/075,380, filed on Jun. 25, 2008.

(51) Int. Cl.
*G10L 15/26* (2006.01)
*G10L 15/18* (2013.01)

(52) U.S. Cl.
CPC .......... *G10L 15/26* (2013.01); *G10L 15/1815* (2013.01)

(58) Field of Classification Search
CPC . G10L 15/1815; G10L 15/183; G10L 15/187; G10L 15/19; G10L 15/26; G06F 17/28; G06F 17/2818
See application file for complete search history.

(56) References Cited

U.S. PATENT DOCUMENTS

| | | | |
|---|---|---|---|
| 8,275,615 B2 * | 9/2012 | Kozat et al. | 704/240 |
| 2004/0064316 A1 | 4/2004 | Gallino | |
| 2007/0156403 A1 * | 7/2007 | Coifman | 704/252 |

* cited by examiner

*Primary Examiner* — Angela A Armstrong
(74) *Attorney, Agent, or Firm* — Meunier Carlin & Curfman

(57) ABSTRACT

A method of operating a speech processing system is provided. The method includes translating a portion of a speech record into a plurality of possible words associated with a plurality of contexts, and determining a plurality of correctness values based on a plurality of probabilities that each of the plurality of possible words is correct for each of the plurality of contexts. The method also includes determining which of the plurality of possible words is a correct translation of the portion of the speech record based on the plurality of correctness values.

20 Claims, 5 Drawing Sheets

SYSTEM AND METHOD FOR CONTEXT SENSITIVE INFERENCE IN A SPEECH PROCESSING SYSTEM

CROSS-REFERENCE TO RELATED APPLICATION(S)

This application is a continuation of U.S. Utility application Ser. No. 12/491,587 filed Jun. 25, 2009, entitled "System and Method Context Sensitive Inference in a Speech Processing System," which claims the benefit of U.S. Provisional Patent Application No. 61/075,380, filed on Jun. 25, 2008, and entitled "Context Sensitive Inference," all of which are hereby incorporated by reference in their entireties.

TECHNICAL FIELD

Aspects of this invention are related in general to the field of speech to text translation. In particular, aspects of this invention are related to the use of context in determining a correct translation of a portion of speech to text.

TECHNICAL BACKGROUND

Speech to text translation systems typically include a variety of different audio sources producing a multitude of individual speech records. These speech records are translated to text using any of a wide variety of methods. Sometimes an utterance may be translated into two different words and the speech to text translation system must decide which of the translations is correct.

Often probabilities are determined to represent the probability of correct translation for each word or utterance. Words with a low probability of correct translation may be re-processed using a different speech to text translation method or may be flagged for later processing. Metadata may accompany the speech records and a review of the metadata may be useful in determining the correct translation. For example, the metadata may include identities of the speakers which would allow inferences to be made about the type of speech within the record and may be used to adjust the probabilities of correct translation based on the information within the metadata.

OVERVIEW

A method of operating a speech processing system is provided. The method includes translating a portion of a speech record into a plurality of possible words associated with a plurality of contexts, and determining a plurality of correctness values based on a plurality of probabilities that each of the plurality of possible words is correct for each of the plurality of contexts. The method also includes determining which of the plurality of possible words is a correct translation of the portion of the speech record based on the plurality of correctness values.

In an embodiment, each correctness value corresponds to only one possible word of the plurality of possible words. In another embodiment, each probability of the plurality of probabilities corresponds to only one context of the plurality of contexts. In a further embodiment each probability of the plurality of probabilities corresponds to only one possible word of the plurality of possible words.

In another embodiment, each correctness value comprises a sum of each probability of the plurality of probabilities corresponding to one possible word of the plurality of possible words. In a further embodiment, determining which of the plurality of possible words is the correct translation of the portion of the speech record based on the plurality of correctness values comprises determining which of the plurality of possible words corresponds to a correctness value greater than any remaining other correctness values of the plurality of correctness values.

In another embodiment, each possible word corresponds to a subset of probabilities of the plurality of probabilities. In a further embodiment, each correctness value corresponds to a different one of the plurality of possible words, and wherein each correctness value comprises a sum of the subset of probabilities corresponding to the different one of the plurality of possible words.

In a further embodiment a method of operating a speech processing system is provided. The method includes receiving a portion of a speech record, and determining a first context and a second context for the portion of the speech record, wherein the first context has a first probability of correct context and the second context has a second probability of correct context.

The method also includes processing the portion of the speech record to create a first text translation for the portion of the speech record in a first context, wherein the first text translation has a first probability of correct translation within the first context, and processing the portion of the speech record to create a second text translation for the portion of the speech record in a second context, wherein the second text translation has a second probability of correct translation within the second context.

The method further includes processing the first probability of correct translation within the first context and the first probability of correct context, resulting in a first probability, and processing the second probability of correct translation within the second context and the second probability of correct context, resulting in a second probability. The method also includes selecting the first translation when the first probability is greater than the second probability, and selecting the second translation when the second probability is greater than the first probability.

In another embodiment a speech processing system is provided. The speech processing system includes a communication interface configured to receive a speech record, and a processing system coupled to the communication interface. The processing system is configured to receive a speech record from the communication interface and store the speech record in a memory, to translate a portion of the speech record into a plurality of possible words associated with a plurality of contexts, to determine a plurality of correctness values based on a plurality of probabilities that each of the plurality of possible words is correct for each of the plurality of contexts, and to determine which of the plurality of possible words is a correct translation of the portion of the speech record based on the plurality of correctness values.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Speech to text translation accuracy may be improved by considering the context in which a speech record was generated. For example, a speech record may contain an utterance that may be translated as either "socks" or "stocks." Each translation may have a probability of correct translation associated with it. However, when the context of the speech is considered it may be easy to determine which translation is most probably correct. For example, if this utterance were found in a speech record from a stock brokerage house, most likely the correct translation is "stocks." However, if the same utterance were found in a speech record from a clothing store, most likely the correct translation is "socks."

Each utterance has many possible contexts. Some contexts are temporal. For example, contexts may include days of the week, month, time of day, season, or the like. Some contexts are related to professions. For example, contexts may include call centers (inbound and outbound), type of profession, function with a profession or the like.

Figure 1:
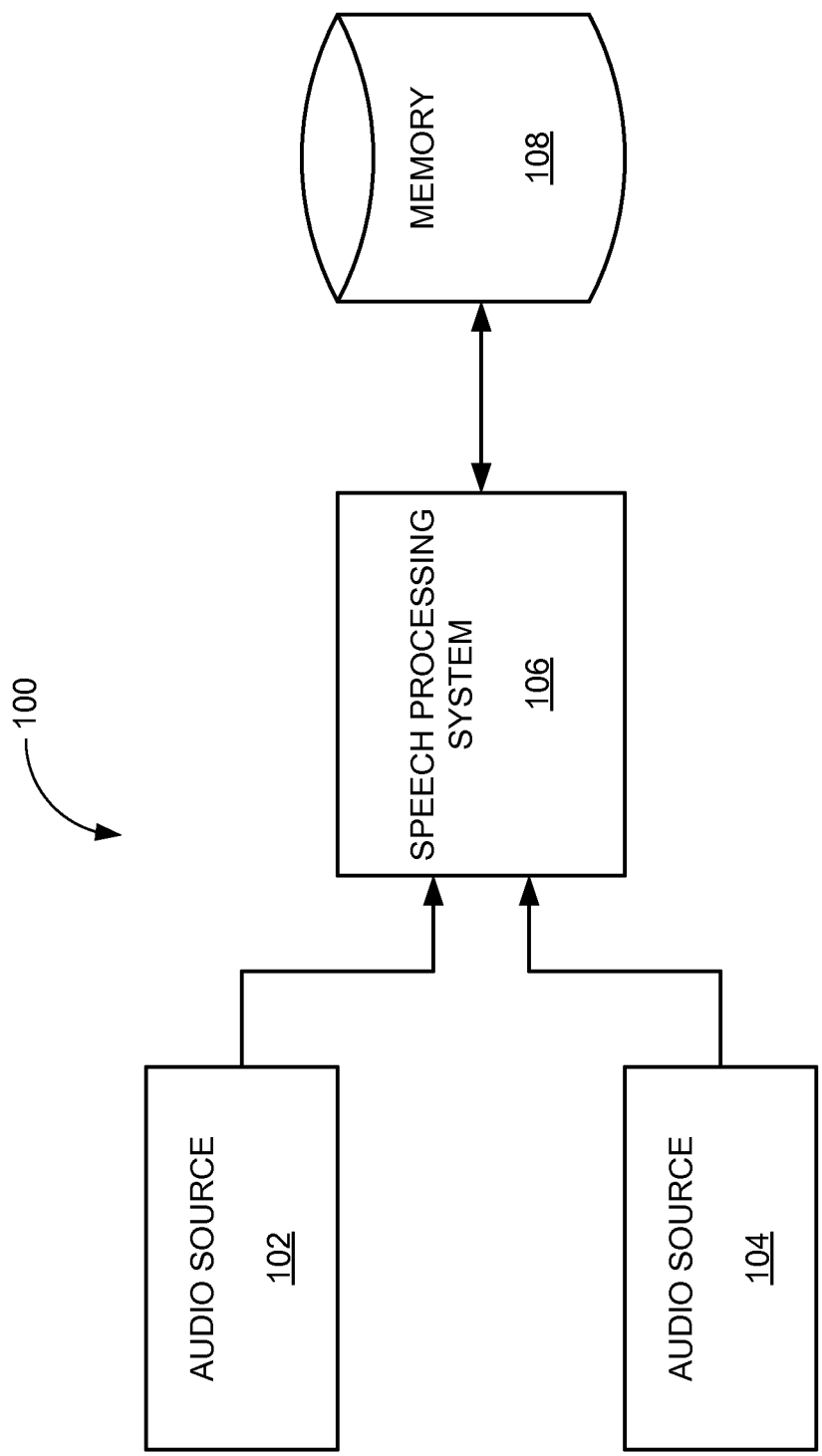
FIG. 1 is a block diagram illustrating an audio processing system.

FIG. 1 is a block diagram illustrating audio processing system 100. Audio processing system 100 includes audio source 102, audio source 104, speech processing system 106 and memory 108. In this example, audio source 102 and audio source 104 are any audio sources capable of producing speech records. They may perform processing on audio captured by a microphone or the like and same the audio data as a speech record. Speech processing system 106 may be a general purpose computer programmed to operate as a speech processing system or may be a system specifically designed as a speech processing system. Speech processing system 106 may be any combination of hardware and software capable of working together as a speech processing system. Memory 108 may be any type of memory capable of storing speech records. In some embodiments, memory 108 may be incorporated into speech processing system 106.

Audio source 102 and audio source 104 produce speech records which are transferred to speech processing system 106. Speech processing system 106 receives at least a portion of a speech record and stores it in memory 108. Speech processing system 106 then translates a portion of a speech record into a plurality of possible words associated with a plurality of contexts. As described above, the plurality of different contexts may be any possible context in which the speech record was obtained.

Speech processing system 106 also determines a plurality of correctness values based on a plurality of probabilities that each of the plurality of possible words is correct for each of the plurality of contexts. Thus, an utterance translated as "socks" has a higher probability of being correct in the context of a clothing store than it has in the context of a stock brokerage.

Speech processing system 106 further determines which of the plurality of possible words is a correct translation of the portion of the speech record based on the plurality of correctness values. As discussed above, in the context of a stock brokerage house the probability is that an utterance is correctly translated as "stocks" rather than "socks."

In an example, each correctness value corresponds to only one possible word of the plurality of possible words. In another example, each probability of the plurality of probabilities corresponds to only one context of the plurality of contexts. In a further example each probability of the plurality of probabilities corresponds to only one possible word of the plurality of possible words.

In another example, each correctness value comprises a sum of each probability of the plurality of probabilities corresponding to one possible word of the plurality of possible words. In a further example, determining which of the plurality of possible words is the correct translation of the portion of the speech record based on the plurality of correctness values comprises determining which of the plurality of possible words corresponds to a correctness value greater than any remaining other correctness values of the plurality of correctness values.

In another example, each possible word corresponds to a subset of probabilities of the plurality of probabilities. In a further example, each correctness value corresponds to a different one of the plurality of possible words, and wherein each correctness value comprises a sum of the subset of probabilities corresponding to the different one of the plurality of possible words.

Figure 2:
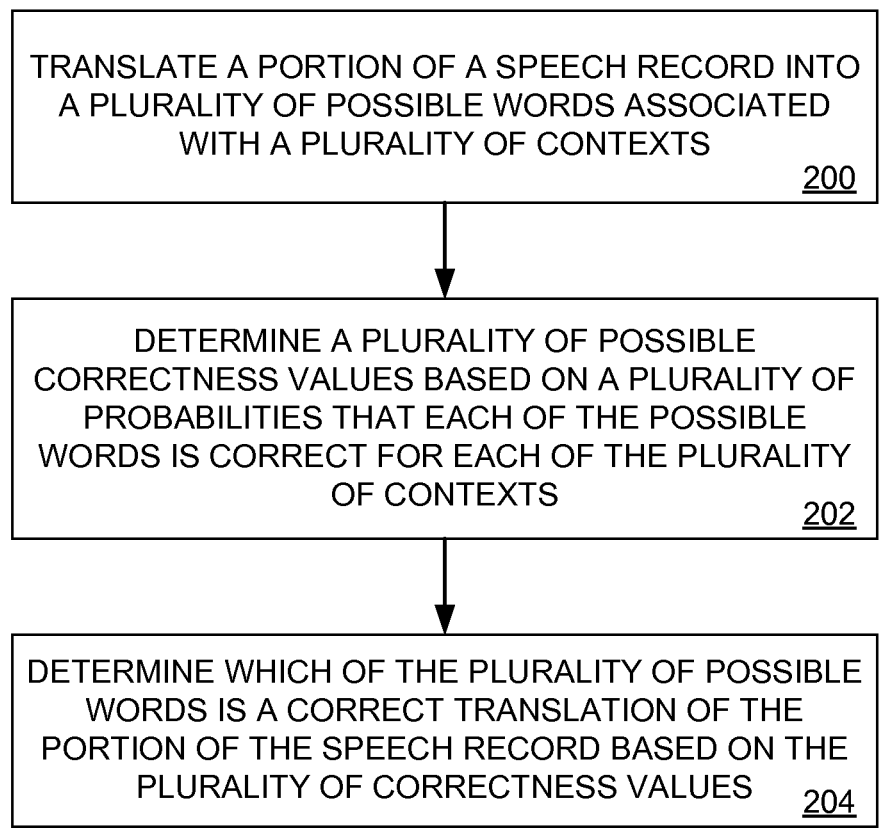
FIG. 2 is a flow diagram illustrating method for operating a speech processing system.

FIG. 2 is a flow diagram illustrating method for operating speech processing system 106. In this example, speech processing system 106 translates a portion of a speech record into a plurality of possible words associated with a plurality of contexts (operation 200). Speech processing system 106 then determines a plurality of possible correctness values based on a plurality of probabilities that each of the possible words is correct for each of the plurality of contexts (operation 202).

Speech processing system further determines which of the plurality of possible words is a correct translation of the portion of the speech record based on the plurality of correctness values (operation 204). This method allows for improved probability of correct translation by considering the context in which the portion of the speech record was obtained.

Figure 3A:
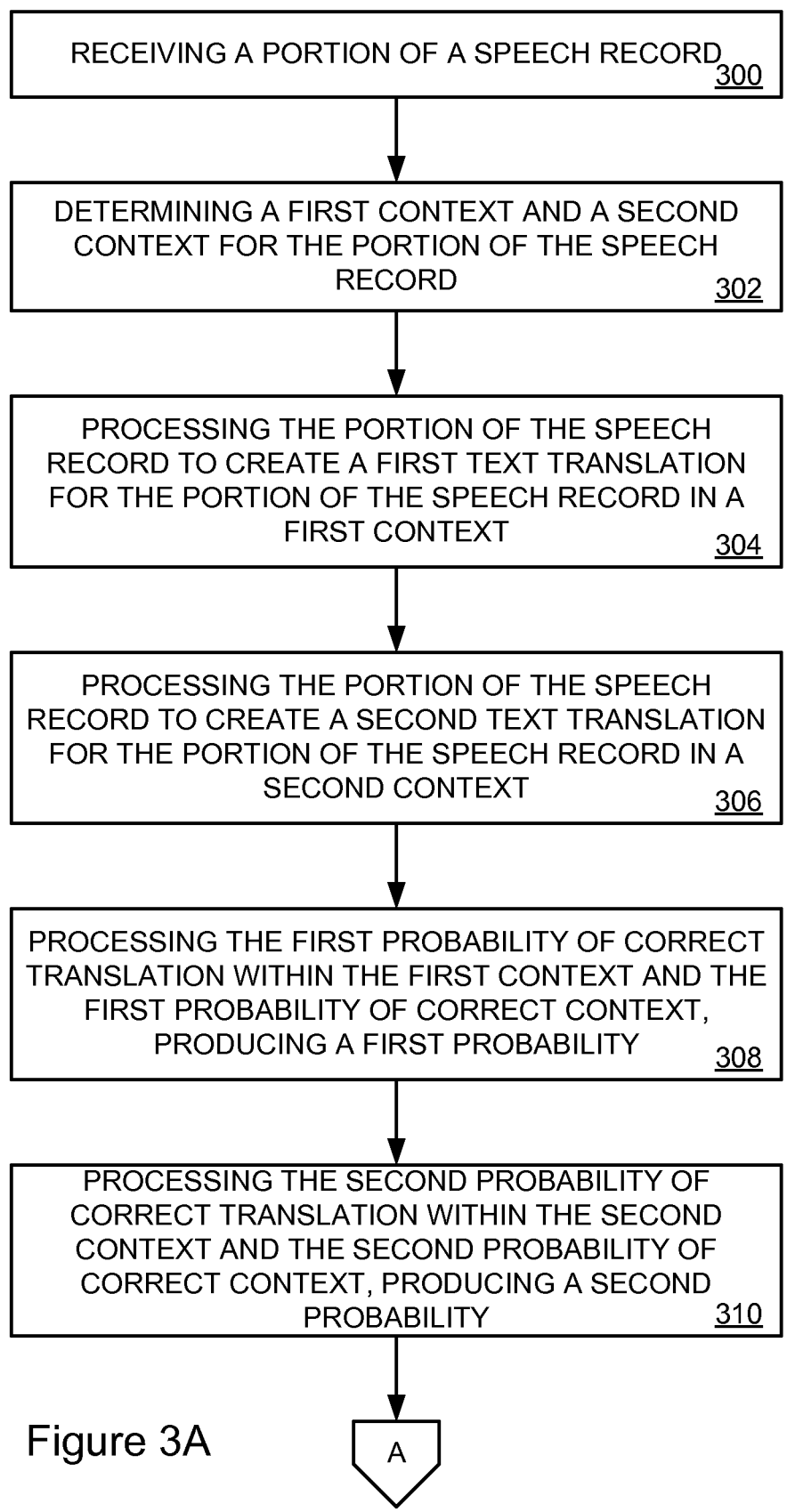
FIGS. 3A and 3B are flow diagrams illustrating a method for operating a speech processing system.
Figure 3B:
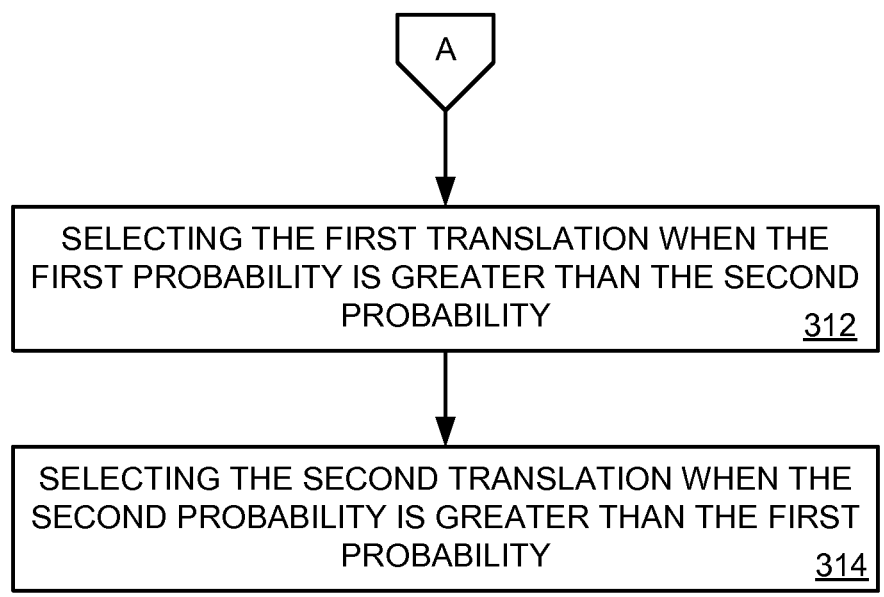

FIGS. 3A and 3B are flow diagrams illustrating another example method for operating speech processing system 106. In this example, speech processing system 106 receives a portion of a speech record (operation 300). Optionally, speech processing system 106 may save the portion of the speech record in memory 108.

Speech processing system 106 determines a first context and a second context for the portion of the speech record (operation 302). The first context has a first probability of correct context and the second context has a second probability of correct context. In the example given above, the first context may be a clothing store and the second context may be a stock brokerage house. The probabilities of correct context may be determined by examination of metadata accompanying the portion of the speech record or by other means or methods.

Speech processing system 106 processes the portion of the speech record to create a first text translation for the portion of the speech record in a first context (operation 304). The first text translation has a first probability of correct translation within the first context. In the example given above, the first text translation may be "socks" and it has associated with it a probability of correct translation within the context of a clothing store.

Speech processing system 106 processes the portion of the speech record to create a second text translation for the portion of the speech record in a second context (operation 306). The second text translation has a second probability of correct translation within the second context. In the example given above, the second text translation may be "stocks" and it has associated with it a probability of correct translation within the context of a stock brokerage house.

Speech processing system 106 processes the first probability of correct translation within the first context and the first probability of correct context, resulting in a first probability (operation 308). In some examples the first probability of correct translation within the first context may be multiplied by the first probability of correct context, resulting in the first probability.

Speech processing system 106 processes the second probability of correct translation within the second context and the second probability of correct context, resulting in a second probability (operation 310). In some examples the second probability of correct translation within the second context may be multiplied by the second probability of correct context, resulting in the second probability.

Speech processing system 106 selects the first translation as the correct translation when the first probability is greater than the second probability (operation 312), and selects the second translation as the correct translation when the second probability is greater than the first probability (operation 314).

In an example, the portion of the speech record is a portion of a conversation and the context for the portion of the speech record is an identity of a speaker. In another example, the portion of the speech record is a portion of a conversation, and the context for the portion of the speech record is a location of a speaker.

In a further example, the portion of the speech record is a portion of a sentence, and the context for the portion of the speech record is a position of the portion of the speech record within the sentence. In another example, the portion of the speech record is a portion of a call, and the context for the portion of the speech record is a position of the portion of the speech record within the call.

In a further example, the portion of the speech record is a portion of a conversation, and the context for the portion of the speech record is a position of the portion of the speech record within the conversation.

Figure 4:
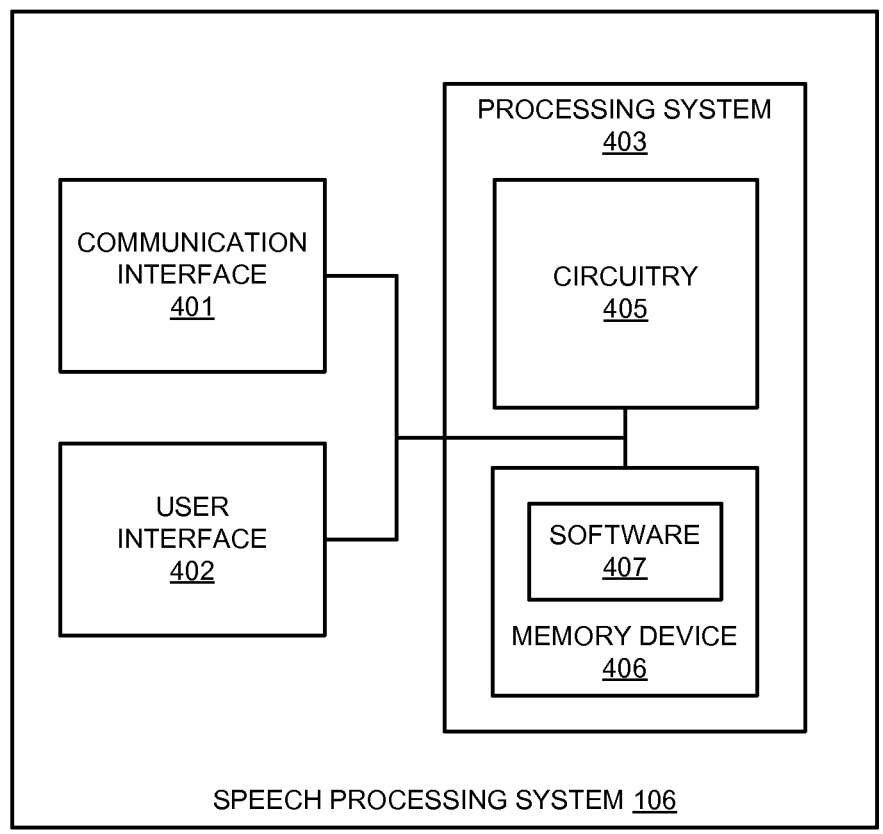
FIG. 4 is a block diagram illustrating a speech processing system.

FIG. 4 illustrates speech processing system 106. Speech processing system 106 includes communication interface 401, user interface 402 and processing system 403. Processing system 403 is linked to communication interface 401. Processing system 403 includes processing circuitry 405 and memory device 406 that stores operating software 407.

Communication interface 401 includes components that communicate over communication links, such as network cards, ports, RF transceivers, processing circuitry and software, or some other communication devices. Communication interface 401 may be configured to communicate over metallic, wireless, or optical links. Communication interface 401 may be configured to use TDM, IP, Ethernet, optical networking, wireless protocols, communication signaling, or some other communication format—including combinations thereof.

User interface 402 includes components that interact with a user. User interface 402 may include a keyboard, display screen, mouse, touch pad, or some other user input/output apparatus. User interface 402 may be omitted in some examples.

Processing circuitry 405 includes microprocessor and other circuitry that retrieves and executes operating software 407 from memory device 406. Memory device 406 comprises a disk drive, flash drive, data storage circuitry, or some other memory apparatus. Operating software 407 comprises computer programs, firmware, or some other form of machine-readable processing instructions. Operating software 407 may include an operating system, utilities, drivers, network interfaces, applications, or some other type of software.

In this example, operating software 407 includes software configured to instruct communication interface 401 to receive a portion of a speech record. Operating software 407 also instructs processing circuitry 405 to store the portion of the speech record in memory device 406 and to translate a portion of a speech record into a plurality of possible words associated with a plurality of contexts. Operating software 407 further instructs processing circuitry 405 to determine a plurality of correctness values based on a plurality of probabilities that each of the plurality of possible words is correct for each of the plurality of contexts, and to determine which of the plurality of possible words is a correct translation of the portion of the speech record based on the plurality of correctness values.

In another example, operating software 407 includes software configured to instruct communication interface 401 to receive a portion of a speech record and to store the portion of the speech record in memory device 406. Operating software 407 also instructs processing circuitry 405 to determine a first context and a second context for the portion of the speech record, wherein the first context has a first probability of correct context and the second context has a second probability of correct context.

Operating software 407 further instructs processing circuitry 405 to process the portion of the speech record to create a first text translation for the portion of the speech record in a first context, wherein the first text translation has a first probability of correct translation within the first context, and to process the portion of the speech record to create a second text translation for the portion of the speech record in a second context, wherein the second text translation has a second probability of correct translation within the second context.

Operating software 407 also instructs processing circuitry 405 to process the first probability of correct translation within the first context and the first probability of correct context, resulting in a first probability, and to process the second probability of correct translation within the second context and the second probability of correct context, resulting in a second probability. Operating software 407 further instructs processing circuitry 405 to select the first translation when the first probability is greater than the second probability, and to select the second translation when the second probability is greater than the first probability.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a speech processing system, the method comprising:
    receiving a portion of a speech record from an audio source, the speech record having been produced by the audio source and transferred by the audio source to the speech processing system;
    determining, by the speech processing system, from metadata accompanying the portion of the speech record, a first context and a second context for the portion of the speech record, wherein the first context has a first probability of correct context and the second context has a second probability of correct context;
    processing, by the speech processing system, the portion of the speech record to create a first text translation for the portion of the speech record in the first context, wherein the first text translation has a first probability of correct translation within the first context;
    processing, by the speech processing system, the same portion of the speech record to create a second text translation for the portion of the speech record in the second context, wherein the second text translation has a second probability of correct translation within the second context;
    processing, by the speech processing system, the first probability of correct translation and the first probability of correct context, to produce a first probability;
    processing, by the speech processing system, the second probability of correct translation within the second context and the second probability of correct context, to produce a second probability;
    selecting, by the speech processing system, the first translation as the correct translation when the first probability is greater than the second probability; and
    selecting, by the speech processing system, the second translation as the correct translation when the second probability is greater than the first probability.

2. The method of claim 1, wherein the portion of the speech record is a portion of a conversation and the context for the portion of the speech record is an identity of a speaker.

3. The method of claim 1, wherein the portion of the speech record is a portion of a conversation and the context for the portion of the speech record is a location of a speaker.

4. The method of claim 1, wherein the portion of the speech record is a portion of a sentence and the context for the portion of the speech record is a position of the portion of the speech record within the sentence.

5. The method of claim 1, wherein the portion of the speech record is a portion of a call and the context for the portion of the speech record is a position of the portion of the speech record within the call.

6. The method of claim 1, wherein the portion of the speech record is a portion of a conversation and the context for the portion of the speech record is a position of the portion of the speech record within the conversation.

7. The method of claim 1, wherein the first probability of correct translation within the first context is multiplied by the first probability of correct context, resulting in the first probability.

8. A non-transitory computer readable medium having stored thereon instructions that, when executed by processing circuitry, direct the processing circuitry to perform the steps comprising:
    receiving a portion of a speech record from an audio source, the speech record having been produced by the audio source and transferred to the processing circuitry;
    determining, from metadata accompanying the portion of the speech record, a first context and a second context for the portion of the speech record, wherein the first context has a first probability of correct context and the second context has a second probability of correct context;
    processing the portion of the speech record to create a first text translation for the portion of the speech record in the first context, wherein the first text translation has a first probability of correct translation within the first context;
    processing the same portion of the speech record to create a second text translation for the portion of the speech record in the second context, wherein the second text translation has a second probability of correct translation within the second context;
    processing the first probability of correct translation and the first probability of correct context, to produce a first probability;
    processing the second probability of correct translation within the second context and the second probability of correct context, to produce a second probability;
    selecting the first translation as the correct translation when the first probability is greater than the second probability; and
    selecting the second translation as the correct translation when the second probability is greater than the first probability.

9. The non-transitory computer readable medium of claim 8, wherein the portion of the speech record is a portion of a conversation and the context for the portion of the speech record is an identity of a speaker.

10. The non-transitory computer readable medium of claim 8, wherein the portion of the speech record is a portion of a conversation and the context for the portion of the speech record is a location of a speaker.

11. The non-transitory computer readable medium of claim 8, wherein the portion of the speech record is a portion of a sentence and the context for the portion of the speech record is a position of the portion of the speech record within the sentence.

12. The non-transitory computer readable medium of claim 8, wherein the portion of the speech record is a portion of a call and the context for the portion of the speech record is a position of the portion of the speech record within the call.

13. The non-transitory computer readable medium of claim 8, wherein the portion of the speech record is a portion of a conversation and the context for the portion of the speech record is a position of the portion of the speech record within the conversation.

14. The non-transitory computer readable medium of claim 8, wherein the first probability of correct translation within the first context is multiplied by the first probability of correct context, resulting in the first probability.

15. A processing system comprising:

processing circuitry; and a memory device in communication with the processing circuitry, the memory device having computer-executable instructions stored thereon that, when executed by the processing circuitry, instruct the processing circuitry to:

receive a portion of a speech record from an audio source, the speech record having been produced by the audio source and transferred to the processing circuitry;

determine, from metadata accompanying the portion of the speech record, a first context and a second context for the portion of the speech record, wherein the first context has a first probability of correct context and the second context has a second probability of correct context;

process the portion of the speech record to create a first text translation for the portion of the speech record in the first context, wherein the first text translation has a first probability of correct translation within the first context;

process the same portion of the speech record to create a second text translation for the portion of the speech record in the second context, wherein the second text translation has a second probability of correct translation within the second context;

process the first probability of correct translation and the first probability of correct context, to produce a first probability;

process the second probability of correct translation within the second context and the second probability of correct context, to produce a second probability;

select the first translation as the correct translation when the first probability is greater than the second probability; and select the second translation as the correct translation when the second probability is greater than the first probability.

16. The processing system of claim 15, wherein the portion of the speech record is a portion of a conversation and the context for the portion of the speech record is an identity of a speaker.

17. The processing system of claim 15, wherein the portion of the speech record is a portion of a conversation and the context for the portion of the speech record is a location of a speaker.

18. The processing system of claim 15, wherein the portion of the speech record is a portion of a sentence and the context for the portion of the speech record is a position of the portion of the speech record within the sentence.

19. The processing system of claim 15, wherein the portion of the speech record is a portion of a call and the context for the portion of the speech record is a position of the portion of the speech record within the call.

20. The processing system of claim 15, wherein the portion of the speech record is a portion of a conversation and the context for the portion of the speech record is a position of the portion of the speech record within the conversation.

* * * * *